Oct. 9, 1951  J. I. LUTZ  2,570,254
OCCUPANT-PROPELLED STEP-BY-STEP VEHICLE
Filed May 24, 1949  3 Sheets-Sheet 3
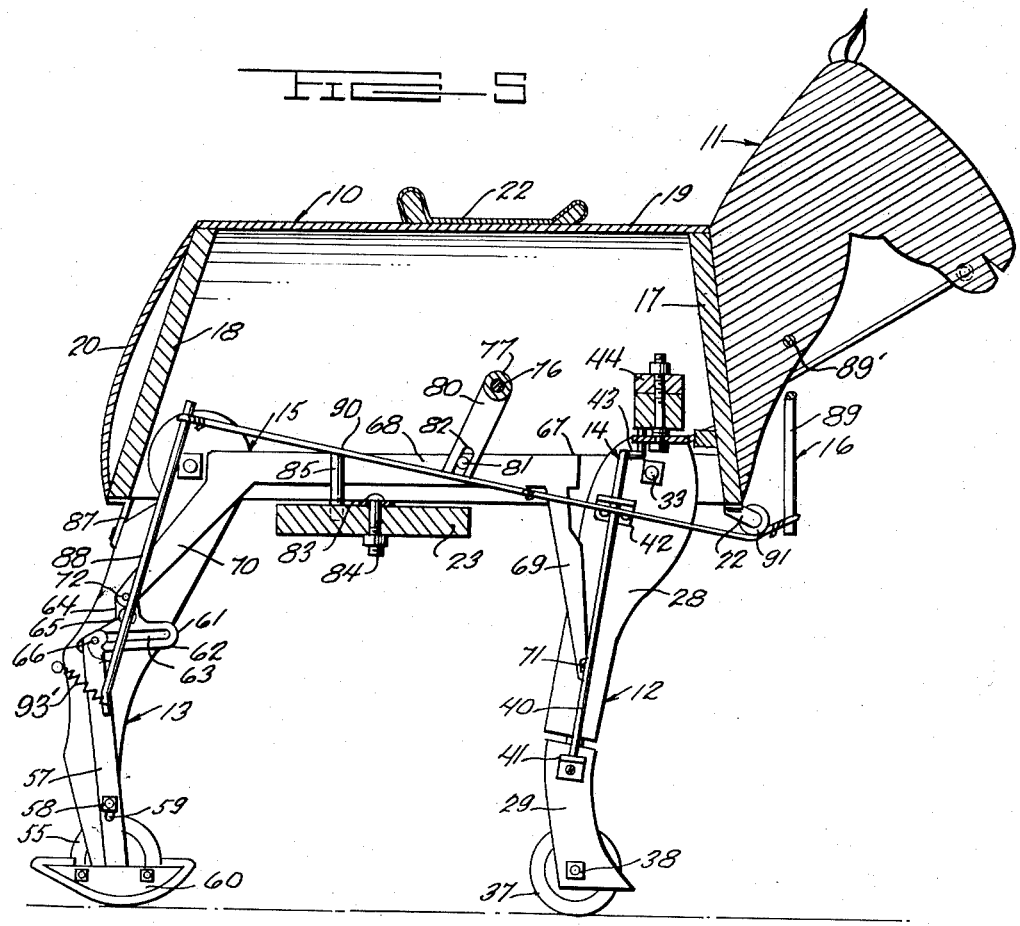
INVENTOR.
JAMES I. LUTZ
BY
McMorrow, Berman & Davidson
ATTORNEYS Patented Oct. 9, 1951

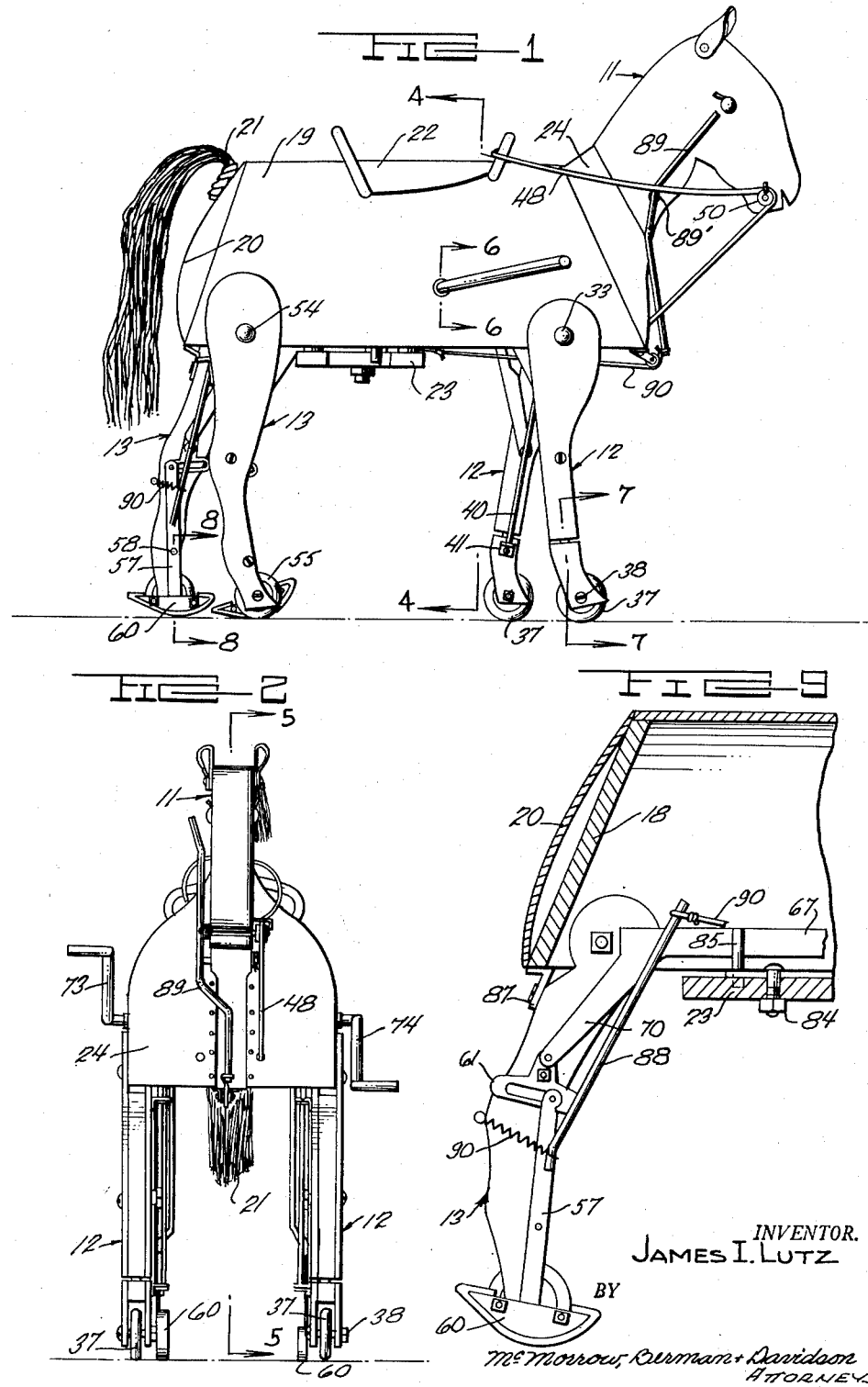

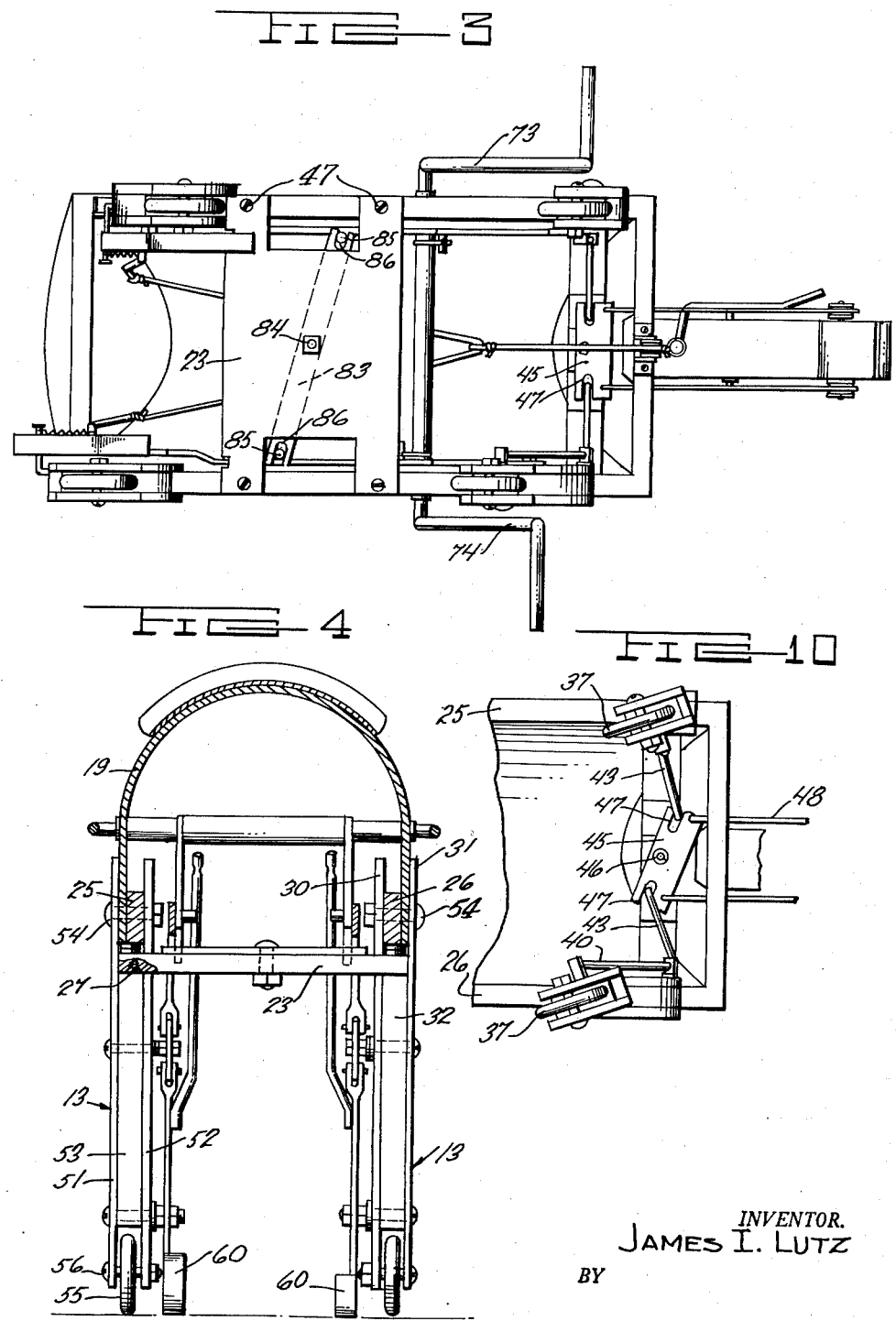

2,570,254

UNITED STATES PATENT OFFICE 2,570,254

OCCUPANT-PROPELLED STEP-BY-STEP VEHICLE

James I. Lutz, Statesville, N. C.

Application May 24, 1949, Serial No. 94,997

5 Claims. (Cl. 280—1.181)

This invention relates to an occupant-propelled, step-by-step vehicle, and more particularly to a child's vehicle in the form of a hobbyhorse of equivalent animal simulation.

It is among the objects of the invention to provide an improved, occupant-propelled vehicle in form of a hobbyhorse or equivalent simulation, which is of extremely light weight while, at the same time, being strong and durable in construction, which includes a simplified propelling mechanism capable of selectively propelling the vehicle either forwardly or rearwardly and of effective braking movement of the vehicle in either direction, and which mechanism is occupant operated by a pair of foot peddles simulating saddle stirrups, which vehicle is easily steerable and has full movement of all four legs, and which is economical to manufacture and neat and attractive in appearance.

Other objects and advantages will become apparent from a consideration of the following description and the appended claims in conjunction with the accompanying drawings, wherein:

Figure 1 is a side elevation of an occupant-propelled vehicle illustrative of the invention;

Figure 2 is a front end elevation of the vehicle illustrated in Figure 1;

Figure 3 is a bottom plan view of the vehicle;

Figure 4 is a transverse cross-section on the line 4—4 of Figure 1;

Figure 5 is a longitudinal cross-section on the line 5—5 of Figure 2;

Figure 6 is a transverse cross-section of a fragmentary portion of the vehicle taken on the line 6—6 of Figure 1, and showing a structural detail;

Figure 7 is a longitudinal cross-section of a fragmentary portion of the vehicle taken on the line 7—7 of Figure 1, and showing a structural detail;

Figure 8 is a longitudinal cross-section of a fragmentary portion of the vehicle taken on the line 8—8 of Figure 1, and showing a structural detail;

Figure 9 is a longitudinal cross-section of a fragmentary rear portion of the vehicle taken substantially on the same section plane as Figure 5, but showing the parts in a different operative position from that illustrated in Figure 5; and Figure 10 is a bottom plan view of a fragmentary front portion of the vehicle similar to Figure 3, but showing the parts in a different operative position from that illustrated in Figure 3.

With continued reference to the drawings, the vehicle comprises, in general, an elongated, hollow body 10, a head structure 11 secured to the front end of the body and projecting forwardly from the latter, a pair of front legs 12, spaced apart and pivotally connected at their upper ends to the body 10 near the front end of the latter, a pair of rear legs 13 spaced apart and pivotally connected at their upper ends to the body near the rear end of the latter, steering mechanism 14, combined propelling and braking mechanism 15, and reversing mechanism 16.

The hollow body 10 comprises a front end wall 17 having a substantially straight bottom edge and a curved side and top edge joined at its ends to the corresponding ends of the bottom edge, a rear end wall 18 of substantially the same size and shape as the front end wall 17, but disposed at an upwardly-converging angle to the front end wall, and a transversely-curved, thin-walled cover 19 secured at its opposite ends to the curved edges of the front end wall 17 and the rear end wall 18, respectively. A convexly-curved cover 20 overlies the outer face of the rear end wall 18 and a tail structure 21, simulating the tail of a horse, is secured at one end to the cover 20 near the upper end of the latter and depends at the rear of the body. A seat 22, in the form of a saddle, is fixed on the cover 19 of the body intermediate the length of the cover and overlying the upper sides of the latter, and a brace 23 is disposed below the body intermediate the length of the latter and is connected at its opposite ends to the respectively opposite edges of the body cover 19, the cover extending over the curved edges of the end walls only.

The head structure 11 may conveniently be formed as a solid block of light weight material, such as wood of low specific gravity, and is shaped to simulate the head and neck of a horse. This head structure is rigidly secured at its rear end to the outer side of the front end wall 17, and a faring 24 of suitable thin-walled material extends from the front end of the body cover 19 to the head structure 11 ahead of the front end of the body to provide a smooth surface at the juncture of the head structure with the front end of the body.

A pair of longitudinal frame members 25 and 26 extends longitudinally of the body between the front end wall 17 and the rear end wall 18 at respectively opposite sides of the body, and at the inner side of the cover 19, with their bottom edges substantially flush with the adjacent edges of the body cover, and the transverse brace 23 is securely attached at its opposite ends to these longitudinal frame members 25 and 26 respectively by suitable means, such as the wood screws 27.

The two front legs are substantially identical in construction, and each includes an upper portion 28 and a separate lower portion 29. Each front leg upper portion comprises two spaced-apart, substantially parallel plates 30 and 31, and a filler 32 of wood, or other suitable material disposed between the plates and terminating short of the upper ends of the latter. The outer plate 31 overlies the outer side of the body wall or cover 19, and the inner plate 30 overlies the inner side of the corresponding longitudinal frame member 25 or 26, and a bolt 33 extends through the two plates of the front leg upper portion 28, through the cover 19 and through the longitudinal frame member 26 to pivotally secure the front leg upper portion to the body near the upper end of such portion for swinging movement of the lower end of such front leg upper portion forwardly and rearwardly of the body.

The lower portion 29 of each front leg also comprises a pair of side plates 34 and 35, which are spaced apart and substantially parallel, and a filler 36 disposed between the plates 34 and 35 and terminating short of the bottom ends of the plates. A rubber tired wheel 37 is disposed between the two side plates of the lower portion of each front leg and is rotatably mounted on an axle pin or bolt 38 extending through the side plates near their lower ends.

As particularly illustrated in Figure 7, the filler 32 of the upper portion 28 of each front leg is provided, in its lower end, with a substantially centrally-located socket, and the filler 36 of the lower portion 29 is provided with a complementary socket and a pivot pin 39 is received, at its opposite ends, in the sockets in the fillers 32 and 36 respectively to pivotally connect the lower portion 29 of each front leg to the upper portion 28 thereof, so that the lower portions of the front legs can be turned to steer the vehicle.

The steering mechanism 14 comprises a rod 40 extending longitudinally of each front leg upper portion 28 at the inner side of such front leg, and rigidly secured at its lower end to the corresponding front leg lower portion 29 by an angle bracket 41. Near its upper end the rod 40 is journaled in an angle bracket 42 secured on the upper portion 28 of the front leg adjacent the upper end of the latter, and this rod is provided, at its upper end, with an offset crank 43.

A transverse frame member 44 extends transversely of the hollow body 10 near the front end wall 17, and is secured at its opposite ends to the two side frame members 25 and 26. A plate 45 is pivotally secured, near its mid-length location, to the cross frame member 44 near the mid-length location of the latter by a suitable pivot bolt 46. This plate is preferably disposed at the under surface of the cross frame member and is provided in its opposite ends with respective elongated notches 47 which receive the distal ends of the cranks 43 on the upper ends of the rods 40, so that, when the plate 45 is turned about the pivot pin 46, the front wheels 37 will be turned, as illustrated in Figure 10, to steer the vehicle in one direction or the other, depending upon the direction in which the plate 45 is turned.

The plate is provided, adjacent its opposite ends, with respective apertures slightly spaced from the notches 47, and the opposite ends of a flexible strap 48 are secured to the respectively opposite ends of the plate 45 by means of these apertures. The strap 48 extends forwardly from the plate 45 and upwardly, and its opposite sides are carried over sheaves 50 mounted on the head structure 11 at respectively opposite sides and near the front end of the latter. From the sheaves 50 the strap 48 is extended rearwardly to a location adjacent the seat 22 where it is in convenient reach of the occupant of the vehicle.

Each of the rear legs comprises an outer side plate 51, an inner side plate 52 disposed in spaced, substantially parallel relationship to the corresponding outer side plate, and a filler 53 disposed between the two side plates 51 and 52 and terminating short of both ends of the side plates. At the upper end of the rear leg, the outer side plate overlies the outer surface of the body cover 19, and the inner side plate overlies the inner surface of the corresponding longitudinal frame member 25 or 26, and a pivot bolt 54 extends through the two side plates and through the cover 19 and the corresponding longitudinal frame member to pivotally secure the upper end of each rear leg to the body for swinging movement of the lower ends of such legs forwardly and rearwardly of the body.

A rubber tired wheel 55 is disposed between the side plates of each rear leg at the lower ends of such side plates, and is journaled on a pivot pin or bolt 56 which extends through the hub of the wheel and through the side plates 51 and 52 near the lower ends of the latter.

The vehicle-propelling mechanism 15 comprises a pair of bars 57 respectively disposed adjacent the inner sides of the rear legs 13, and extending longitudinally of the lower portions of the rear legs. Each bar is slidably and pivotally connected to the adjacent rear leg by a bolt 58 extending from the leg through an elongated, longitudinally-extending slot 59 in the bar. A shoe 60 is secured on the lower end of each bar 57, and each shoe has a convexly-curved, padded lower edge for engaging the ground, the curvature of the lower edge of each shoe being somewhat sharper over the forward half than over the rearward half of the shoe.

The bars 57 have a length approximately one-half the length of the rear legs of the vehicle, and T-shaped levers 61 are respectively disposed at the inner sides of the rear legs 13 at the upper end of the bars 57. The T-shaped levers 61 are inverted in use, and each has an elongated cross 62 provided with an elongated, longitudinally-extending slot 63, and a stem 64 projecting upwardly from the cross substantially at the mid-length location of the latter. Each lever 61 is pivotally connected to the respective vehicle rear leg by a pivot screw or bolt 65 extending through an aperture in the stem 64 of the lever adjacent the mid-length location of the lever slot 63, and into the vehicle leg. Each bar 57 is bifurcated near its upper end to straddle the slotted portion of the corresponding lever 61, and a pin 66 extends through the bifurcated portion of each bar 57 and through the slot of the associated lever to slidably connect the upper end of each bar 57 to a respective lever 61.

Two inverted, U-shaped structures 67 are disposed within the hollow body 10 at respectively opposite sides of the body and near the inner sides of the corresponding side rails 25 and 26. Each of these structures has a substantially straight bight portion 68 and has, at its front and rear ends, depending legs 69 and 70 respectively. The depending leg at the front end of each U-shaped structure 67 is pivotally secured, near its lower end, to the upper portion 28 of the adjacent front leg near the lower end of said front leg upper portion by a suitable pin or screw 71, and the leg 70 depending at the rear end of each U-shaped structure is pivotally connected at its lower end to the stem 64 at the adjacent lever 61 by a suitable pivot pin or rivet 72. The pivotal connection between the leg 70 of each U-shaped structure and the corresponding lever 61 is spaced from the side of the pivotal connection between the lever and the respective vehicle rear leg opposite the slot 63, so that, when the U-shaped structure is moved forwardly and rearwardly relative to the vehicle body, the corresponding lever 61 will be turned about its pivotal connection 65 with the associated vehicle rear leg, and will also swing the associated rear leg forwardly and rearwardly.

With this construction, when a U-shaped structure 67 is moved rearwardly, the corresponding rear leg 13 will be swung rearwardly, carrying with it the associated bar 57 and, if the upper end of the bar 57 is at the rearward end of the slot 63, the bar will be simultaneously forced downward, forcing the shoe 60 into engagement with the ground or other substantially horizontal supporting structure on which the vehicle rests.

Two cranks or foot pedals, comprising a right-hand crank 73 and a left-hand crank 74, project through the cover 19 of the hollow body at respectively opposite sides of the body and intermediate the length of the latter. The shafts 75 and 76 of these cranks extend inwardly of the body in co-axial alignment with each other, and a tubular sleeve 77 receives the shafts 75 and 76 in its opposite ends to maintain the two shafts in co-axial alignment during operation of the cranks. A bushing 78 is secured on the shaft of each crank near the adjacent end of the sleeve 77, and is journaled in a respective aperture in the cover 19. Each sleeve 78 is secured to its respective crank by suitable means, such as a diametrically-disposed rivet 79 extending through the sleeve and the shaft portion of the crank.

An arm 80 is secured to each of the cranks 73 and 74. Each arm 80 is apertured near one end to receive the shaft portion of the associated crank and is welded or otherwise rigidly secured at such one end to the end of the associated bushing 78 opposed to the adjacent end of the sleeve 77.

A pin 81 projects laterally inward from the bight portion 68 of each U-shaped structure 67 intermediate the length of such bight portion, and each arm 80 is provided, in its lower end, with an elongated notch 82 rotatably and slidably receiving the corresponding pin 81.

A lever 83 is disposed on the upper surface of the transverse brace or support 23 and is pivotally connected, substantially at its mid-length location, to the brace 23, substantially at the midlength location of the latter by a pivot bolt 84. A pin 85 projects downwardly from each U-shaped structure bight portion 68, and the lever 83 is provided, in its opposite ends, with elongated slots 86 which respectively receive the pins 85 below the bight portion 68. The lever 83 is effective to maintain the movements of the two U-shaped structures 67 substantially equal and opposite relative to each other.

With this arrangement, if one of the cranks 73 or 74 is depressed by foot pressure, the associated U-shaped structure 67 will be forced rearwardly and the opposite U-shaped structure will be simultaneously forced forwardly by the lever 83, raising the opposite crank. When one of the U-shaped structures is forced rearwardly, the front and rear legs on that side of the vehicle will both be swung rearwardly simultaneously, and the front and rear legs at the opposite side of the vehicle will be simultaneously swung forwardly incident to the forward movement of the opposite U-shaped structure. Alternative depressions of the two cranks 73 and 74 will thus cause the U-shaped structures to move forwardly and rearwardly successively, one moving rearwardly while the other is moving forwardly, thus swinging the legs at the opposite sides of the vehicle in respectively opposite directions. If the upper ends of the bars 57 are at the rear ends of the slots in the respective T-shaped levers 61, so that rearward movement of the U-shaped structures forces the bars 57 downwardly as the legs are swung rearwardly, the associated foot 60 will be forced downwardly into engagement with the ground at the beginning of the rearward movement of each rear leg and the vehicle will be propelled in a forward direction by alternating depressions of the two cranks or foot pedals. When the pedal pressure is released and forward movement of the U-shaped member initiated, the foot will be raised so that the leg can be moved forwardly without material resistance.

If the upper ends of the bars 57 are at the forward ends of the slots in the respective T-shaped levers 61, the bars 57 will be forced downwardly when the legs are swung forwardly, and will be released when the legs are swung rearwardly. Thus, with the upper ends of the bars at the forward ends of the corresponding slots the vehicle will be propelled rearwardly upon alternating depressions of the foot pedal cranks.

An angle bracket 87 is secured to each rear leg 13 at the rear edge of such leg and in position to contact the bottom edge of the rear end wall 18 of the body when the associated rear leg has swung rearwardly a predetermined distance. These angles brackets serve as stops for rearward swinging movements of the rear legs and transfer the effort applied to the foot pedals from swinging the rear legs rearwardly to forcing the bars 57 downwardly. Thus, by holding the pedals depressed after the associated rear legs have reached their limiting rearward position, as determined by the stop brackets 87, the shoes 60 may be held in engagement with the ground and serve to brake the forward movement of the vehicle.

The reversing mechanism 16 comprises two extensions 88 respectively secured to the bars 57 and extending upwardly from the bars into the interior of the hollow body 10, a hand lever 89 pivotally connected intermediate its length to the head structure 11 of the vehicle at 89′, and extending from a location at the bottom of the head structure to a location near the top of the head structure, and within convenient reach of a vehicle occupant seated on the seat 22, and a flexible strand 90 connecting the lower end of the lever 89 to the upper ends of both of the extensions 88. By moving the upper end of the lever 89 rearwardly, the upper ends of the bars 57 are moved to the forward ends of the slots 63 in the corresponding T-shaped levers 61, whereupon alternating depression of the pedals 73 and 74 will impart a rearwardly-directed movement to the vehicle. When the lever 89 is released, springs 93, respectively connected between the bars 57 and the corresponding rear legs 13, will move the upper ends of the bars rearwardly to the rear ends of the corresponding slots 63 to restore the forward movement of the vehicle. A sheave 91 is journaled at the outer end of a bracket 92 extending forwardly and downwardly from the bottom edge of the front wall 17 of the body to guide the flexible strand 90 and reduce frictional resistance to movement of this strand by the lever 89 to shift the direction of travel of the vehicle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An occupant-propelled, step-by-step vehicle comprising an elongated hollow body, four legs pivotally connected at their upper ends to said body and including a pair of spaced-apart front legs disposed at one end of said body and a pair of spaced-apart rear legs disposed at the opposite end of said body, a wheel rotatably mounted on the lower end of each leg, such wheels extending below the respective legs to support the body, a head structure secured to the front end of said body and projecting forwardly from the latter, each of said front legs being divided intermediate its length to provide an upper portion and a separate lower portion, means connecting the lower portion of each front leg to the respective upper portion for turning movements of said lower portions relative to said upper portions, occupant-operated means carried by said head structure and connected to the lower portions of said front legs for turning said lower portions to manually steer the vehicle, a crank journaled in each side of said body intermediate the length of the latter, such cranks being depressible by the feet of the occupant to propel the vehicle, an arm on each crank at the inner side of the respective side of the body, an inverted U-shaped structure at each side of said body interiorly of the latter, means pivotally connecting the end of the forward leg of each inverted U-shaped structure to the vehicle front leg at the same side of the body intermediate the length of such leg, means pivotally and slidably connecting each arm at its distal end to the bight of the adjacent U-shaped structure intermediate the length of such bight, a bar extending longitudinally of the lower portion of each rear leg at the inner side of the latter, means connecting each bar to the respective rear leg for longitudinal movement of the bar relative to the leg, a shoe of the lower end of each bar, each said shoes being a curved and padded ground-engaging lower surface, a T-shaped lever having an elongated slot therein pivotally mounted on each rear leg at the inner side of the latter and adjacent the upper end of the associated bar, means slidable in the slot of each lever connecting the upper ends of the adjacent bars to said levers, means pivotally connecting the end of the rearward leg of each U-shaped structure to the adjacent lever at a location spaced from the side of the pivotal connection between the lever and the corresponding vehicle leg opposite the respective lever slot so that rearward movement of each U-shaped structure will simultaneously impart a rearward movement to the associated rear vehicle leg and a downward movement to the corresponding bar when the upper ends of the bars are connected to the levers near the rearward ends of the lever slots, and forward movement of each U-shaped structure will simultaneously impart a forward movement to the associated rear vehicle leg and a downward movement to the corresponding bar when the upper ends of the bars are connected to the levers near the forward ends of the lever slots, occupant-operated, motion-reversing means carried by said head structure and connected to said bars to move the upper ends of said bars between the rear and front ends of said lever slots, a support extending transversely of said body intermediate the length of the latter, and a lever pivotally connected adjacent its mid-length location to said support and connected at its opposite ends to said U-shaped structures respectively to maintain the movements of said U-shaped structures substantially equal and opposite relative to each other.

2. An occupant propelled step by step vehicle comprising an elongated hollow body, a head structure secured to the front end of the body and extending forward thereof, a pair of spaced apart front legs pivotally connected at their upper ends to said body near the front end of the latter, a pair of spaced apart rear legs pivotally connected at their upper ends to said body near the rear end of the latter, a wheel journaled on each leg at the bottom end thereof, a propelling shoe disposed adjacent each rear leg wheel, a link connecting each shoe to the adjacent rear leg for movement of the shoe relative to the associated rear leg, a pair of foot operated cranks journaled in said body and projecting from respectively opposite sides of the latter, means connecting each crank to the front and rear legs at the same side of the body to swing the rear legs rearwardly upon depression of the corresponding pedal, means connecting each leg moving means to the adjacent link to force the corresponding shoes downwardly into engagement with the ground as the corresponding legs are swung rearwardly, and means pivotally mounted on said body and connected to the two leg moving means to maintain the swinging movement of the legs at respectively opposite sides of said body substantially equal and opposite in direction.

3. An occupant propelled step by step vehicle comprising an elongated hollow body, a head structure secured to the front end of the body and extending forwardly thereof, a pair of spaced apart front legs pivotally connected at their upper ends to said body near the front end of the latter, a pair of spaced apart rear legs pivotally connected at their upper ends to said body near the rear end of the latter, a wheel journaled on each leg at the bottom end thereof, a propelling shoe disposed adjacent each rear leg wheel, a link connecting each shoe to the corresponding leg for movement of the shoe relative to the associated rear leg, a pair of foot operated cranks journaled in said body and projecting from respectively opposite sides of the latter, means connecting said cranks to the front and rear legs of the vehicle for swinging movement of the legs at one side of the vehicle rearwardly when the crank on the same side of the vehicle is depressed and simultaneous swinging movement of the legs at the other side of the vehicle forwardly, means connecting the leg swinging means to said links to force each shoe into tractive engagement with the ground as the corresponding rear leg is swung in one direction or the other, means pivotally mounted on said body and connected to the two leg moving means to maintain the swinging movements of the legs at respectively opposite sides of the body substantially equal and opposite in direction, and stop means on each of said rear legs engageable with said body to limit rearward swinging movement of said rear leg whereby the shoes may be maintained depressed by continued pressure on said cranks to act as brakes for retarding forward movement of the vehicle.

4. An occupant propelled step by step vehicle comprising an elongated hollow body, a head structure secured to the front end of the body and extending forwardly thereof, a pair of spaced apart front legs pivotally connected at their upper ends to said body near the front end of the latter, a pair of spaced apart rear legs pivotally connected at their upper ends to said body near the rear end of the latter, a wheel journaled on each leg at the bottom thereof, a propelling shoe disposed adjacent each rear leg, a link connecting each shoe to the adjacent rear leg for movement of the shoe relative to the associated rear leg, a pair of foot operated cranks journaled in said body and projecting from respectively opposite sides of the latter, means connecting said cranks to the front and rear legs of the vehicle for swinging movement of the legs at one side of the vehicle rearwardly when the crank on the same side of the vehicle is depressed and simultaneous swinging movement of the legs at the other side of the vehicle forwardly, means connecting the leg swinging means to said links to force each shoe into tractive engagement with the ground as the corresponding leg is swung in one direction or the other, means pivotally mounted on said body and connected to the two leg moving means to maintain the swinging movements of the legs at respectively opposite sides of the body substantially equal and opposite in direction, and manually operated means carried by said body and connected to the means connecting said leg swinging means to said links for moving the connecting means to reverse the action of said shoes in relation to the rearward and forward swinging movements of said rear legs to thereby reverse the direction of movement of the vehicle upon alternating depression of said cranks.

5. An occupant propelled step by step vehicle comprising an elongated hollow body, a head structure secured to the front end of the body and extending forwardly thereof, a pair of spaced apart front legs pivotally connected at their upper ends to said body near the front end of the latter, a pair of spaced apart rear legs pivotally connected at their upper ends to said body near the rear end of the latter, a wheel journaled on each leg at the bottom end thereof, a propelling shoe disposed adjacent each rear leg wheel, a link connecting each shoe to the corresponding rear leg for movement of the shoe relative to the leg, a pair of foot operated cranks journaled in said body and projecting from respectively opposite sides of the latter, means connecting said cranks to the front and rear legs of the vehicle for swinging movement of the legs at one side of the vehicle rearwardly when the crank on the same side of the vehicle is depressed and simultaneous swinging movement of the legs at the other side of the vehicle forwardly, means connecting the leg swinging means to said links to force each shoe downwardly into tractive engagement with the ground as the corresponding rear leg is swung in one direction or the other, means pivotally mounted on said body and connected to the leg moving means to maintain the swinging movements of the legs at respectively opposite sides of said body substantially equal and opposite in direction, each of said front legs including an upper portion and a separate lower portion, means pivotally connecting the lower portion of each front leg to the corresponding upper portion, a plate pivotally mounted on said body, means connecting the opposite ends of said plate to the lower portions of said front legs to impart vehicle steering movements to said lower leg portions upon turning of said plate about its pivotal connection with said body, and a flexible strand connected at its opposite ends to respectively opposite ends of said plate for turning said plate.

JAMES I. LUTZ.

REFERENCES CITED

The following references are of record in the file of this patent:

UNITED STATES PATENTS

| Number | Name | Date |
|---|---|---|
| 818,826 | Hitt | Apr. 24, 1906 |
| 1,708,090 | Hague | Apr. 9, 1929 |
| 2,120,102 | Kurelic | June 7, 1938 |
| 2,173,536 | Jester | Sept. 19, 1939 |